United States Patent
Chang et al.

(10) Patent No.: US 9,411,625 B2
(45) Date of Patent: Aug. 9, 2016

(54) APPARATUS AND CONTROL METHOD FOR HYPERVISOR TO OBTAIN FAULTING INSTRUCTION

(71) Applicant: International Business Machines Corporation, Armonk, NY (US)

(72) Inventors: Xiao Tao Chang, Beijing (CN); Yi Ge, Beijing (CN); Hao Li, Beijing (CN); Tao Liu, Beijing (CN); Kun Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 14/105,906

(22) Filed: Dec. 13, 2013

(65) Prior Publication Data

US 2015/0169348 A1    Jun. 18, 2015

(51) Int. Cl.
*G06F 9/38* (2006.01)
*G06F 9/455* (2006.01)

(52) U.S. Cl.
CPC .......... *G06F 9/45558* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 7,917,724 | B2 | 3/2011 | Dewan et al. |
| 8,132,167 | B2 | 3/2012 | Barde et al. |
| 8,261,265 | B2 | 9/2012 | Chen et al. |
| 2010/0005272 | A1 * | 1/2010 | Vuletic ............... G06F 12/1081 711/213 |
| 2012/0117301 | A1 | 5/2012 | Wingard |
| 2012/0144167 | A1 | 6/2012 | Yates, Jr. et al. |
| 2012/0216197 | A1 | 8/2012 | Nair |
| 2015/0160998 | A1 * | 6/2015 | Anvin ............... G06F 11/1004 714/807 |

OTHER PUBLICATIONS

Barham et al. Xen and the Art of Virtualization. [online] (Oct. 22, 2003). ACM., pp. 164-177. Retrieved From the Internet <http://ldc.usb.ve/~figueira/Cursos/ci4821/Material/Tema3/Articulo_Xen.pdf>.*
Chinese Application No. 201210505800.X, Filed: Nov. 30, 2012, "Apparatus and Control Method for Hypervisor to Obtain Faulting Instruction", Inventors: Xiao Tao Chang, et al., pp. 1-35.
IP.com, Disclosed Anonymously, "An Efficient TLB Virtualization Algorithm Using Machine Contiguous Page Information in a Virtualization Environment," IPCOM000146587D, IP.com, Feb. 16, 2007, pp. 1-4.
Jan Stoess, et al., "A Lightweight virtual machine monitor for Blue Gene/P," International Journal of High Performance Computing Applications, Sage, Mar. 2012, pp. 1-16.

* cited by examiner

*Primary Examiner* — Emerson Puente
*Assistant Examiner* — Jonathan R Labud
(74) *Attorney, Agent, or Firm* — Cantor Colburn LLP; Keivan Razavi

(57) ABSTRACT

An apparatus for a hypervisor to obtain a faulting instruction, wherein the hypervisor runs between a physical machine including a central processing unit (CPU) and a virtual machine includes a content addressable memory (CAM); a special-purpose register (SPR) which is accessible by the hypervisor; and a control logic circuit with an input terminal connected to the CPU and an output terminal connected to the CAM, the input terminal receiving data from an instruction fetching (IF) stage and a write-back (WB) stage of a CPU instruction pipeline respectively, the output terminal causing instructions from the IF stage of the CPU instruction pipeline to be stored into the CAM and triggering the CAM to output a faulting instruction among the instructions stored therein to the SPR.

18 Claims, 6 Drawing Sheets

| Serial numbers | Stages of Pipeline | | | | | | | |
|---|---|---|---|---|---|---|---|---|
| 1 | IF | ID | EX | MEM | WB | | | |
| 2 | | IF | ID | EX | MEM | WB | | |
| 3 | | | IF | ID | EX | MEM | WB | |
| 4 | | | | IF | ID | EX | MEM | WB |
| 5 | | | | | IF | ID | EX | MEM | WB |
| Clock cycle | 1 | 2 | 3 | 4 | 5 | 6 | 7 | 8 | 9 |

400

S410 — Storing the instruction from the IF stage in the CAM

S420 — Outputting the faulting instruction in the CAM to the SPR in the WB stage

FIG. 4A

S412 — Obtaining an instruction from the IF stage

S414 — Obtaining a first instruction identifier from the IF stage

S416 — Storing the instruction in association with the first instruction identifier to the CAM

FIG. 4B

S422 — Obtaining a second instruction identifier from the WB stage

S424 — Detecting exception interrupt signal sent from the WB stage

S426 — Outputting the Exception_Indicator from the CAM to the SPR

FIG. 4C

APPARATUS AND CONTROL METHOD FOR HYPERVISOR TO OBTAIN FAULTING INSTRUCTION

BACKGROUND

The present invention relates to virtual machine systems and, more specifically, to obtaining faulting instructions by a hypervisor in a virtual machine system.

In many environments, such as servers, desktops, and even embedded systems, virtualization technologies have become increasingly prevalent. Virtualization technologies provide a variety of benefits, including IT optimization, flexible resource management and so on. Generally speaking, virtualization is a broad concept, which is usually related to the partition of real (physical) data processing resources, i.e., making a single data processing resource, such as a server, data storage, operating system or application to seem to act as multiple logical or virtual resources. This concept is wide enough such that it also includes the aggregation of the real data processor resources, i.e., making a plurality of physical resources, such as a server or data storage to seem to be a single logical resource. In a virtualized environment, a hypervisor or a virtual machine monitor (VMM) is running between operating systems of the hardware and the virtual machine. The hypervisor plays an important role in the management of virtual machine software implementation and the share of host hardware resources and so on. A function of the hypervisor is to identify the reason of exception interrupt and perform corresponding processing when the hardware sends out an exception interrupt, for example, to emulate the instruction from the virtual machine that causes the exception interrupt, that is, the faulting instruction. Therefore, the hypervisor firstly needs to locate to the faulting instruction. In the prior art, the hypervisor locates a faulting instruction by address mapping in different address space. It is not efficient in this manner.

SUMMARY

In one embodiment, an apparatus for a hypervisor to obtain a faulting instruction, wherein the hypervisor runs between a physical machine including a central processing unit (CPU) and a virtual machine includes a content addressable memory (CAM); a special-purpose register (SPR) which is accessible by the hypervisor; and a control logic circuit with an input terminal connected to the CPU and an output terminal connected to the CAM, the input terminal receiving data from an instruction fetching (IF) stage and a write-back (WB) stage of a CPU instruction pipeline respectively, the output terminal causing instructions from the IF stage of the CPU instruction pipeline to be stored into the CAM and triggering the CAM to output a faulting instruction among the instructions stored therein to the SPR.

In another embodiment, a control method for a hypervisor to obtain a faulting instruction, wherein the hypervisor runs between a physical machine including a central processing unit (CPU) and a virtual machine includes causing instructions from an instruction fetching (IF) stage of a CPU instruction pipeline to be stored into a content addressable memory (CAM); and triggering the CAM to output a faulting instruction among instructions stored therein to a special-purpose register (SPR) which is accessible by the hypervisor according to the result generated in a write-back stage (WB) of the CPU instruction pipeline.

In another embodiment, a control apparatus for a hypervisor to obtain a faulting instruction, wherein the hypervisor runs between a physical machine including a central processing unit (CPU) and a virtual machine includes a device configured to cause the instruction from an instruction fetching (IF) stage of a CPU instruction pipeline to be stored into a content addressable memory (CAM); and a device configured to trigger the CAM to output a faulting instruction among the instructions stored therein to a special-purpose register (SPR) which is accessible by the hypervisor according to a result generated in a write-back stage of the CPU instruction pipeline.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein like reference numbers generally denote like parts in the embodiments of the present disclosure.

FIGS. 4A, 4B and 4C schematically show flowcharts of the control method in accordance with embodiments of the present invention.

DETAILED DESCRIPTION

In view of the above, embodiments of the present invention improve the manner in which a hypervisor obtains a faulting instruction.

In one aspect, an apparatus is provided for a hypervisor to obtain a faulting instruction, wherein the hypervisor runs between a physical machine including a central processing unit (CPU) and a virtual machine. The apparatus includes a content addressable memory (CAM), a special-purpose register (SPR) which is accessible by the hypervisor, and a control logic circuit with an input terminal connected to the CPU and an output terminal connected into the CAM, the input terminal receiving data from the instruction fetching (IF) stage and the write-back (WB) stage of the CPU instruction pipeline respectively, the output terminal causing instructions from the IF stage of the CPU instruction pipeline to be stored into the CAM and triggering the CAM to output a faulting instruction among the instructions stored therein to the SPR.

In another aspect, a control method is provided for a hypervisor to obtain a faulting instruction, wherein the hypervisor runs between a physical machine including a central processing unit CPU and a virtual machine. The control method includes causing instructions from the instruction fetching (IF) stage of the CPU instruction pipeline to be stored into a content addressable memory (CAM), and triggering the CAM to output a faulting instruction among the instructions stored therein to a special-purpose register which is accessible by the hypervisor according to the result generated in the write-back stage of the CPU instruction pipeline.

In still another aspect, a control apparatus is provided for a hypervisor to obtain a faulting instruction corresponding to the above control method for a hypervisor to obtain a faulting instruction.

Exemplary embodiments will be described in more detail with reference to the accompanying drawings, in which the preferred embodiments of the present disclosure are illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
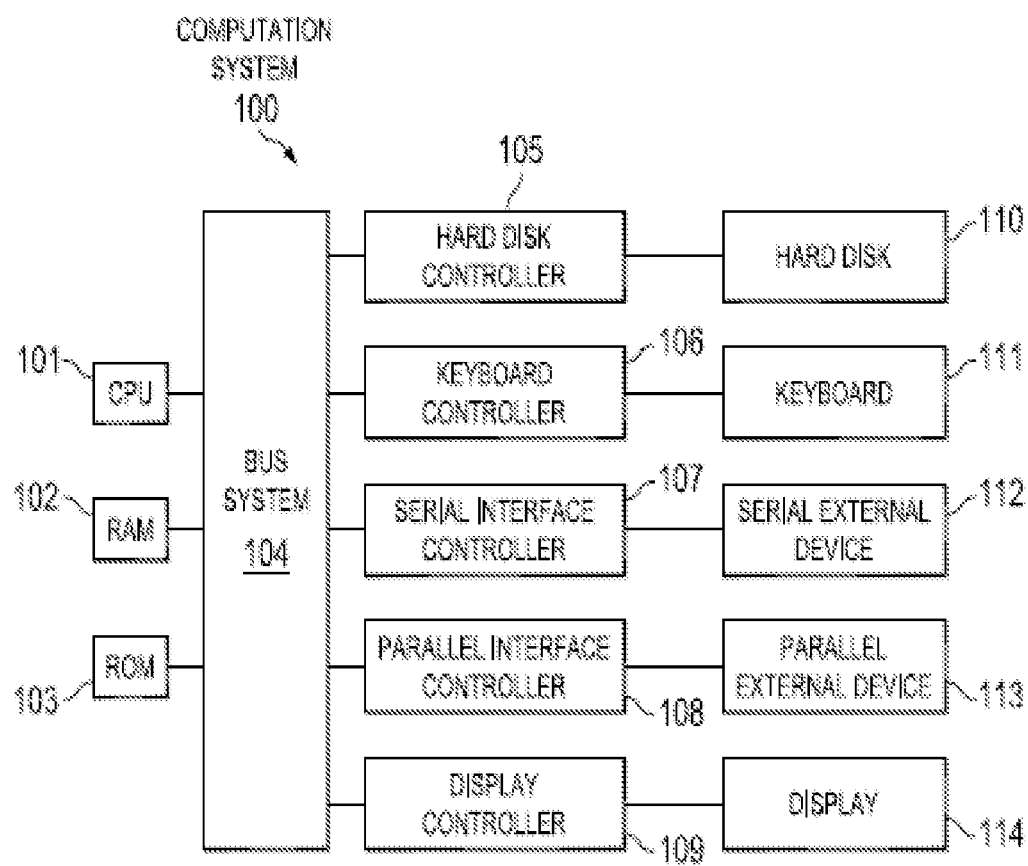
FIG. 1 shows a block diagram of an illustrative computer system 100 adapted to implement embodiments of the present invention.

FIG. 1 shows a block diagram of an illustrative computer system 100 adapted to implement embodiments of the present invention. As shown in FIG. 1, the computer system 100 can include a CPU (central processing unit) 101, a RAM (random access memory) 102, a ROM (read only memory) 103, a system bus 104, a hard disk controller 103, a keyboard controller 106, a serial interface controller 107, a parallel interface controller 108, a display controller 109, a hard disk 110, a keyboard 111, a serial external device 112, a parallel external device 113 and a display 114. Among these devices, connected to the system bus 104 are the CPU 101, the RAM 102, the ROM 103, the hard disk controller 105, the keyboard controller 106, the serial controller 107, the parallel controller 108 and the display controller 109. The hard disk 100 is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It should be understood that, the structural block diagram shown in FIG. 1 is illustrated for the purpose of example, and not a limitation to the scope of the present invention. In some cases, some devices can be added or removed from the structural diagram shown in FIG. 1 depending on specific cases.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or apparatus, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage apparatus, a magnetic storage apparatus, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other apparatus to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other apparatus to cause a series of operational steps to be performed on the computer, other programmable apparatus or other apparatus to produce a computer implemented process such that the instructions which execute on the computer or other programmable apparatus provide processes for implementing the functions/acts specified in the flowchart and/or block diagram block or blocks.

The computer system 100 shown in FIG. 1 may be utilized to implement a processor in a virtualization environment related to the present invention. The process for a hypervisor to obtain a faulting instruction of the present invention may also be executed in the computer system 100 shown in FIG. 1.

The general concept of the present invention is to realize rapid acquiring of faulting instructions by a hypervisor in the virtualization environment with appropriately configured hardware.

With reference to the figures, various embodiments of the present invention will be described below.

Figures 2A, 2B:
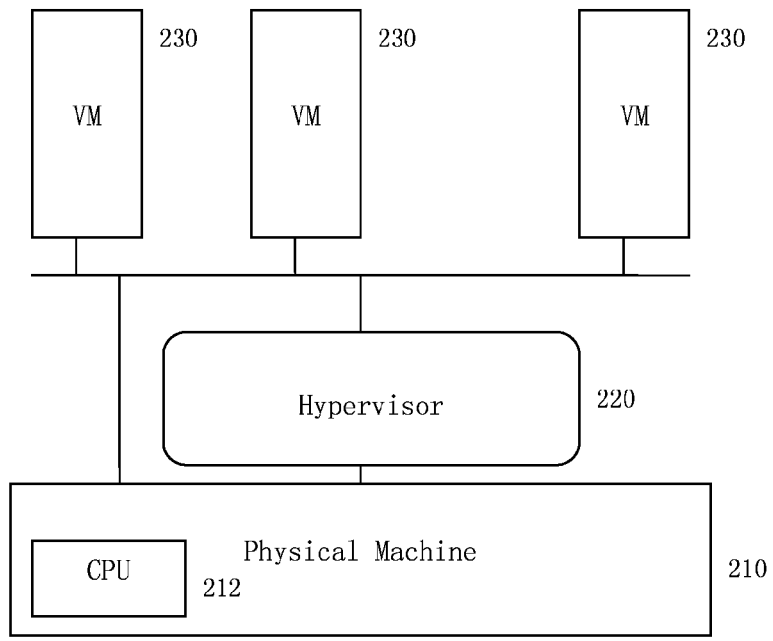
FIG. 2A shows a schematic diagram of virtualization environment adapted to implement embodiment of the present invention.
FIG. 2B schematically shows the instruction pipeline of the processor.

Referring now to FIG. 2A, there is shown a diagram of a virtualization environment in which embodiments of the present invention may be implemented. The virtualization environment 200 shown in FIG. 2A includes hardware (hereinafter referred to as "physical machine") 210, a hypervisor 220 and a virtual machine (VM) 230. The physical machine 210 comprises at least one processor (CPU) 212, for example, IBM's PowerPC of RISC architecture. In addition, other hardware resources may also be included, such as for example computer memory medium (not shown), input/output interface (not shown) and so on. The virtualization environment may provide multiple virtual machines (VM) that share the hardware resource of the physical machine 210. Each virtual machine 230 comprises its own operating system as well as its own applications.

The hypervisor 220 runs between the operating systems (OS) of the physical machine 210 and the virtual machine 230. Typical hypervisors include, for example, KVM and Xen. When instructions from the virtual machine 230 are executed on the physical machine, exceptional circumstances often occur. For example, a certain virtual machine may send out a halt instruction. If the instruction were really executed by the physical machine, that would resulting in the physical machine being shut down and other virtual machines being unable to run. For the virtual machine, such an instruction is one of faulting instructions. The central processing unit (CPU) 212 of the physical machine 210 does not directly execute such an instruction, but sends out an exception interrupt, informing the hypervisor to perform a corresponding processing. The response of a hypervisor to an exception interrupt is to identify the reason of the exception interrupt and perform processing accordingly. For example, it will simulate execution of such an instruction, such as a halt instruction, so as to only shut down the virtual machine that sent out the halt instruction.

Before identifying the reason of the exception interrupt and performing processing accordingly, the hypervisor needs to obtain the faulting instruction. The process of obtaining the faulting instruction is normally as below:

obtaining the virtual address of the faulting instruction of the virtual machine, GVA (guest virtual address), from virtual machine status data structure maintained by the hypervisor, for example, the value of the program counter and the process identifier;

translating the GVA into a physical address of the virtual machine, GPA (guest physical address), according to the page table of the virtual machine;

translating the GPA into a host virtual address according to the memory management mechanism of the hypervisor;

fetching the faulting instruction at the host virtual address by using an interface function provided by the operating system kernel or the hypervisor, for example, the copy_from_user() function under the Linux operating system.

In the above process, when the faulting instruction is fetched at the host virtual address, another exception may also be triggered, for example, an exception of new page error or data missing.

It may be seen from the above that, the process of obtaining the faulting instruction of the hypervisor requires multiple address translations and requires switching among different address spaces of the virtual machine, the physical machine and the hypervisor. Frequent exception interrupts not only impose burden to the hypervisor, but also may cause significantly delay.

It has been recognized herein that, to avoid the above complex operation, the supervisor may directly use the instruction acquired by the CPU 212 at the instruction fetching stage of the instruction pipeline.

FIG. 2B schematically shows the instruction pipeline of the processor.

Those skilled in the art know that almost all high-performance processors employ the instruction pipeline. A typical RISC instruction pipeline is shown in FIG. 2B, which depicts five instruction pipelines, each instruction pipeline being divided into five stages: instruction fetching (IF), instruction decoding (ID), executing (EX), memory access (MEM) and write-back (WB).

Stage 1: IF stage, in which the next instruction to be executed is obtained according to the value of the program counter and the process identifier PID.

Stage 2: ID stage, in which the instruction obtained in the IF stage is decoded into the machine-executable code.

Stage 3: EX stage, in which the instruction code decoded is executed.

Stage 4: MEM stage, in which corresponding read/write operation is performed with respect to the memory based on the execution of the instruction code.

Stage 5: WB stage, in which the result of execution of the instruction is generated. For a faulting instruction, the result of the WB stage includes an indicator indicating the faulting instruction and a context of the faulting instruction. For example, the WB stage generates an interrupt signal to indicate that the current instruction is of faulting instruction, while the value of the program counter and the process identifier corresponding to the instruction are reserved in the machine state register corresponding to the WB stage.

According to the design of the existing instruction pipeline, an instruction acquired in the IF stage will be discarded after the ID stage. Even if the hypervisor 220 receives a notification that the faulting instruction occurs in the WB stage, it is unable to obtain the faulting instruction directly from the instruction pipeline. It is further recognized herein that, without changing the CPU's instruction pipeline architecture and with appropriately configured hardware, instructions that were to be discarded by the instruction pipeline may be saved and, in the WB stage, the faulting instruction may be identified from the saved instructions for the hypervisor to read directly.

Figure 3A:
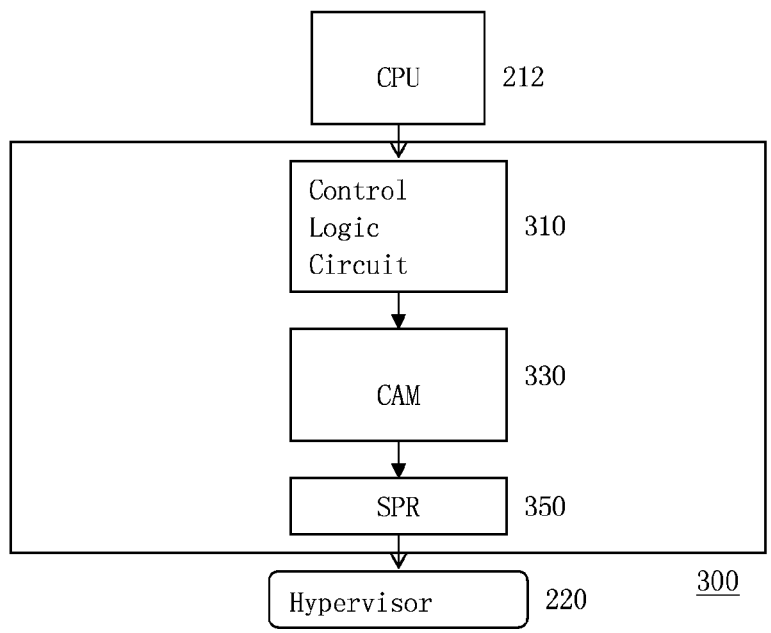
FIG. 3A schematically shows a block diagram of the apparatus in accordance with one embodiment of the present invention.

Referring now to FIG. 3A, there is shown a block diagram of an apparatus 300 for a hypervisor to obtain a faulting instruction according to an embodiment of the present invention. As shown in the figure, the hypervisor 220 runs between a physical machine 210 including a central processing unit CPU 212 and a virtual machine 230. The apparatus 300 includes a content addressable memory (CAM) 330, a special-purpose register (SPR) 350 which is accessible by the hypervisor 220 and a control logic circuit 310. The control logic circuit has an input terminal connected to the CPU and an output terminal connected into the CAM. The input terminal receives data respectively from the IF stage and the WB stage of the CPU instruction pipeline. The output terminal causes the instruction from the IF stage of the CPU instruction pipeline to be stored in the CAM and triggers the CAM to output a faulting instruction among the instructions stored therein to the SPR.

Those skilled in the art would appreciate that the CAM is a special storage array addressable by content. The work mode of CAM includes a write mode and a basic operating mode. In the write mode, data can be written into the CAM. In the basic operating mode, the CAM reads input data and, at the same time, automatically compares the input data (also called "input index value") with the data stored in the CAM to determine whether the input data is matching with any data stored in the CAM and output the information corresponding to the matched data.

As previously mentioned, the next instruction to be executed is obtained in the IF stage of the CPU's instruction pipeline. The obtained instruction will be transmitted to the ID stage. The control logic circuit 310 may obtain the instruction fetched in the IF stage and, at the same time, obtain a unique instruction identifier of the instruction. Further, the control logic circuit 310 may cause the CAM to enter into the write mode and store the obtained instruction in association with the instruction identifier into the CAM.

In the WB stage of the CPU's instruction pipeline, the control logic circuit 310 may also obtain the identifier of the current instruction and determine whether the current instruction is a faulting instruction according to the result generated in the WB stage. If it is a faulting instruction, then the control logic circuit 310 may control the CAM 330 to enter into the basic operating mode and take the identifier of the current instruction as the input index value of the CAM. The CAM compares the identifier of the current instruction with the instruction identifier stored in the CAM automatically and outputs the instruction corresponding to the instruction identifier matching the identifier of the current instruction, that is, the faulting instruction, to the SPR 350.

The above functions of the control logic circuit may be implemented with a combination of hardware logic elements.

Since the SPR 350 is accessible by the hypervisor 220, when occurrence of a faulting instruction is indicated in the WB stage, the hypervisor 220 is caused to read the SPR directly, thereby obtaining the faulting instruction directly. On the basis of the present invention, it is not difficult for one skilled in the art to configure an existing hypervisor by programming to enable the hypervisor to obtain the faulting instruction directly from the SPR.

Figure 3B:
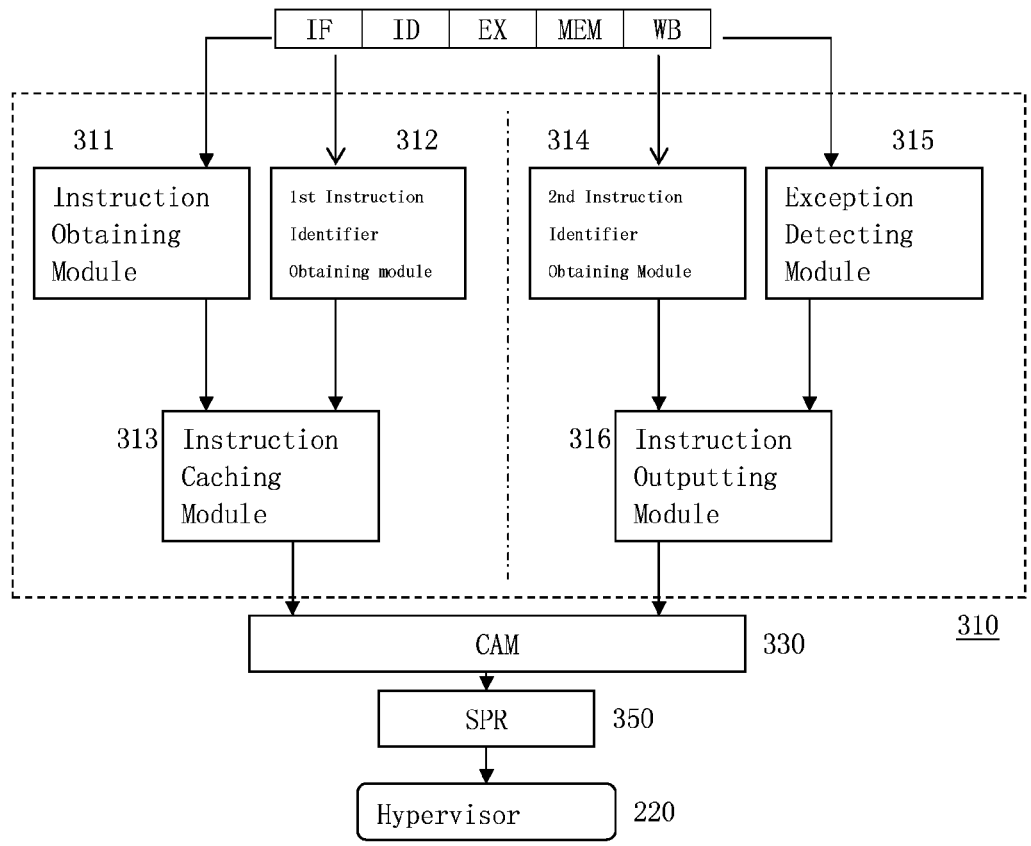
FIG. 3B is a block diagram further illustrating the apparatus in accordance with one embodiment of the present invention.

FIG. 3B illustrates in detail a specific implementation of the control logic circuit 310 in accordance with one embodiment of the invention. The control logic circuit 310 is depicted by a dashed-line block in FIG. 3B, and includes: an instruction obtaining module 311, a first instruction identifier obtaining module 312 and an instruction caching module 313. The function of each of the above modules is described as follows.

The instruction obtaining module 311 is configured to obtain an instruction from the IF stage of the CPU's instruction pipeline. As mentioned above, in the IF stage of the CPU instruction pipeline, the next instruction to be executed is fetched. The fetched instruction is transmitted to the ID stage. In practical applications, the instruction obtaining module 311 may be configured to be able to capture the instructions fetched at the IF stage according to the data stream of the instruction pipeline, without having to change the logic of the instruction pipeline.

The first instruction identifier obtaining module 312 is configured to obtain a first instruction identifier from the IF stage of the CPU's instruction pipeline. An instruction identifier is used for uniquely identifying an instruction. In different environments, instruction identifiers used for identifying instructions may be different in form. In existing instruction pipelines, the combination of the value of the program counter PC and the process identifier PID is normally used as an instruction identifier for uniquely identifying an instruction. In machine state registers corresponding to different stages of the instruction pipeline, context of a current stage is retained, which includes the PC and the PID of the instruction corresponding to the current stage.

According to one embodiment of the invention, the first instruction identifier obtaining module 312 may be further configured to obtain the value of the program counter PC and the process identifier PID from the machine state register corresponding to the IF stage, and take the combination of the value of the program counter PC and the process identifier PID obtained from the machine state register corresponding to the IF stage (for example, the combination in form of "PC+PID" or "PID+PC") as a first instruction identifier.

Those skilled in the art shall appreciate that, in specific applications, the PC and the PID may be obtained by electrical coupling between the input terminal of the first instruction identifier obtaining module 312 and the output terminal of the machine state register corresponding to the IF stage. Details of the specific circuit design are unnecessary and hence omitted herein.

The instruction caching module 313 is configured to store the instruction of the instruction obtaining module 311 in association with the first instruction identifier obtained by the first instruction identifier obtaining module 312 in the CAM 330.

Figure 3C:
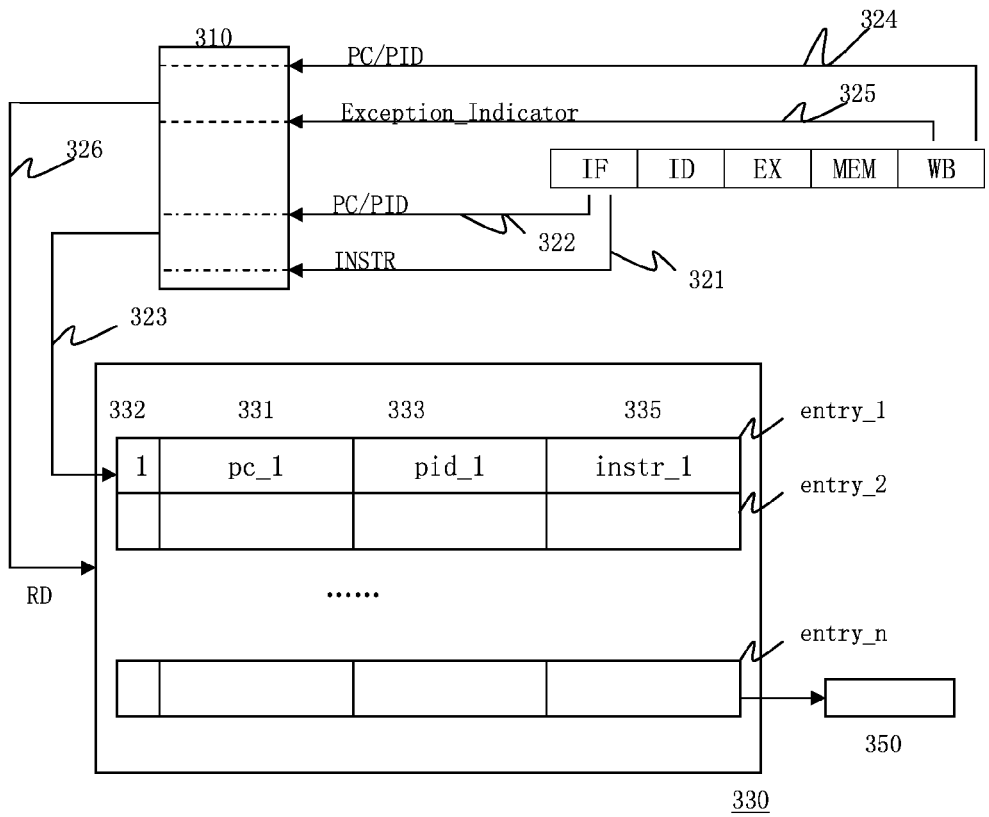
FIG. 3C schematically shows a block diagram of a partial structure of the apparatus in accordance with one embodiment of the present invention.

Referring now to FIG. 3C, the operation of the apparatus in accordance with one embodiment of the present invention is schematically shown. More specifically, FIG. 3C schematically shows an instruction pipeline comprising the five stages of IF, ID, EX, MEM and WB, as well as the control logic circuit 310, the CAM 330 and the SPR 350 according to the present invention. As shown in the figure, the CAM 330 may accommodate n CAM entries (also referred to as "CAM data entries" or "entries"), entry_1, entry_2 and entry_n, wherein the number of CAM entries is not less than the number of instructions in the instruction pipeline, and each of the CAM entries includes fields 331, 333 and 335. The field 331 is 64 bits in length, for example, and is used for storing a value of the program counter PC. The field 333 is 14 bits in length, for example, and is used for storing a process identifier PID. The field 335 is 32 bits in length, for example, and is used for storing an instruction INSTR. The relative position among the fields 331, 333 and 335 may be predefined, rather than limited to that the way shown in the figure. Furthermore, the code form of INSTR may also be decided depending on specific applications and there is no limitation to this by the present invention.

The arrows 321, 322, 323, 324, 325 and 326 in the figure denote operations of the control logic circuit 310. The arrow 321 indicates that the control logic circuit 310 obtains an instruction INSTR from the IF stage of the CPU instruction pipeline, which may be executed by the instruction obtaining module 311. The arrow 322 indicates that, while obtaining the instruction INSTR, the control logic circuit 310 also obtains the first instruction identifier from the IF stage of the CPU instruction pipeline. This operation may be executed by the first instruction identifier obtaining module 312. The first instruction identifier obtaining module 312 may obtain the value of the program counter PC and the process identifier PID from the machine state register corresponding to the IF stage, and take the combination of the PC and the PID as the first instruction identifier.

The arrow 323 indicates that the control logic circuit 310 stores the instruction INSTR from the IF stage of the CPU instruction pipeline into the CAM. This operation may be executed by the instruction caching module 313. The instruction caching module 313 stores the instruction INSTR in association with the first instruction identifier (for example "PC"+"PID") into the CAM. For example, the instruction caching module 313 sends a "write mode" signal to the CAM 330 and, at the same time, uses the PC, the PID and the INSTR as input data. The result is shown, for example, by the data entry entry_1 in the figure. This entry has stored therein an instruction instr_1 and the associated program counter value pc_1 and process identifier Pid_1.

Returning to FIG. 3B, according to one embodiment of the invention, the control logic circuit 310 further comprises a second instruction identifier obtaining module 314, an exception detecting module 315 and an instruction outputting module 316. The second instruction identifier obtaining module 314 is configured to obtain a second instruction identifier from the WB stage of the instruction pipeline.

As described above, according to one embodiment of the invention, the first instruction identifier obtaining module 312 may be further configured to obtain the value of the program counter PC and the process identifier PID from the machine state register corresponding to the IF stage, and take the combination of the value of the program counter PC and the process identifier PID obtained from the machine state register corresponding to the IF stage as the first instruction identifier.

Accordingly, in accordance with one embodiment of the invention, the second instruction identifier obtaining module 314 may be further configured to obtain the value of the program counter PC and the process identifier PID from the machine status register corresponding to the WB stage, and take the combination of the value of the program counter PC and the process identifier PID (for example, the combination in form of "PC+PID" or "PID+PC") obtained from the machine status register corresponding to the WB stage as the second instruction identifier.

Similarly to the above description regarding the first instruction identifier obtaining module 312, in specific applications, the PC and the PID may be obtained by circuit coupling between the input terminal of the second instruction identifier obtaining module 314 and the output terminal of the machine state register corresponding to the WB stage.

The first instruction identifier obtaining module 312 and the second instruction identifier obtaining module 314 are the same in function but different in usage, that is, they are used respectively for obtaining the PC and the PID of the instruction related to different stages of the instruction pipeline. In specific implementations, the two modules may be implemented with a single module instead. Details are not necessary and hence are omitted herein.

Turning to FIG. 3C, the arrow 324 denotes that the control logic circuit 310 obtains the second instruction identifier from the WB stage of the instruction pipeline. This operation may be executed by the second instruction identifier obtaining module 314. The second instruction identifier obtaining module 314 may obtain the value of the program counter PC and the process identifier PID from the machine state register corresponding to the WB stage, and take the combination of the PC and the PID as the second instruction identifier.

Returning to FIG. 3B, the exception detecting module 315 is further described. The exception detecting module 315 is configured to detect an exception interrupt signal sent out at the WB stage of the instruction pipeline. The function is denoted by an arrow 325 in FIG. 3C. The arrow denotes that the control logic circuit 310 detects an exception interrupt signal, Exception_Indicator, sent out at the WB stage of the instruction pipeline, and the operation may be executed by the exception detecting module 315. The exception interrupt signal Exception_Indicator indicates whether the current instruction is a faulting instruction. For example, if Exception_Indicator=1, it indicates that the current instruction is a faulting instruction. If Exception_Indicator=0, it indicates that the current instruction is not a fault instruction. As further shown in FIG. 3B, the instruction outputting module 316 is configured to cause an instruction in the CAM that is associated with the second instruction identifier to be outputted to the SPR 350 in response to the exception interrupt signal indicating a faulting instruction has occurred.

Referring to FIG. 3C, the operation after the control logic circuit 310 captures the result of the WB stage is shown by arrow 326. Supposing the value of the program counter of the current instruction is pc_1, the process identifier of the current instruction is pid_1 and Exception_Indicator="1", then the control logic circuit 310 takes the combination of the value of the program counter pc_1 and the process identifier PID_1, "pc_1+pid_1", as the index value to locate the data entry that includes the same value of the program counter pc_1 and the process identifier PID_1 in the content addressable memory CAM 330, i.e., the data entry entry_1 as shown in FIG. 3C, and outputs the instruction instr_1 in the data entry to the SPR 350.

In specific implementations, the number of data entries or CAM entries that can be accommodated by the CAM may be set depending on specific circumstances, such as the number of instruction pipelines and so on, so that each pending instruction in the instruction pipelines may have a corresponding data entry. Furthermore, in specific design, the storage space of the CAM entry corresponding to each instruction may be released once it is executed for storing instructions subsequently entering into the instruction pipeline.

According to one embodiment of the invention, the control logic circuit 310 also includes a CAM management module (not shown), which is configured to release the storage space of a CAM data entry where an instruction that is no longer in the instruction pipeline is located.

Still referring to FIG. 3C, a one-bit flag field 332 may be set within a data entry (entry_1, entry_2 . . . , entry_n) of the CAM 330 to indicate whether the data entry is valid, or whether the storage space is occupied by the data entry. For example, a flag field 332 being of value 1 indicates that the data entry where the field is located is valid and the control logic circuit 310 may not write a new data entry in the position of the data entry. A flag field being of value 0 indicates the data entry where the field is located is invalid, the storage space is released and the control logic circuit 310 may write a new entry in the position of that data entry.

According to one embodiment of the invention, the instruction caching module 313 is configured to store an instruction of the instruction obtaining module 311 and an first instruction identifier obtained by the first instruction identifier obtaining module 312 only in the position of an data entry in which the value of the flag field is 0 in the CAM. The CAM management module is configured to set the flag bit of the data entry as valid while the instruction caching module 313 writes the instruction and the first instruction identifier. For example, as shown in FIG. 3C, supposing the value of the flag field of data entry entry_1 is 0 at the beginning, the instruction caching module 313 write data pc_1, pid_1 and instr_1 into entry_1. Meanwhile, the CAM management module sets the value of the flag field as 1.

According to one embodiment of the invention, the instruction outputting module 316 performs operation only for a valid data entry in the CAM 330. This may be realized by taking "1"+PC+PID as the input index value of the CAM. While the instruction outputting module 316 causes the instruction associated with the second instruction identifier in the CAM to be outputted to the SPR, the CAM management module simultaneously sets the flag field 332 of the data entry where the instruction is located in the CAM as invalid.

Figure 3D:
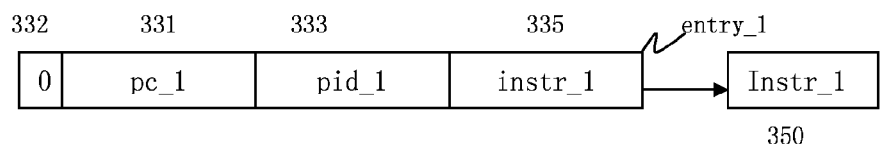
FIGS. 3D, 3E and 3F schematically show the operations of the apparatus in accordance with embodiments of the present invention.

For example, as shown in FIGS. 3C and 3D, the instruction outputting module 316 causes the instruction instr_1 in the entry entry_1 in the CAM 330 as shown in FIG. 3C to be outputted to the SPR 350. At the same time, the CAM management module sets the flag field 332 of the entry as invalid. As shown in FIG. 3D, the result is that the value of the flag field of the entry entry_1 is changed to 0.

Figure 3E:
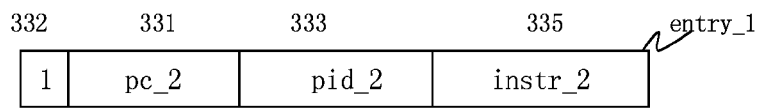
Figure 3F:
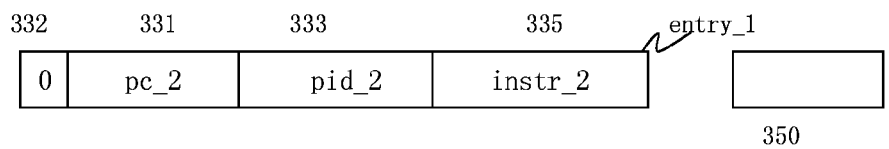

Even if occurrence of a faulting instruction is not found by the exception detecting module 315 and the instruction outputting module 316 does not cause the CAM 330 to output an instruction to the SPR 350, the CAM management module also sets the flag field 332 of the CAM entry in which the second instruction identifier is located as invalid. For example, as shown in FIG. 3E, in a certain valid entry entry_1 there are stored a first instruction identifier "pc_2+pid_2" and an instruction instr_2. If the second instruction identifier obtained by the second instruction identifier obtaining module is same with the first instruction identifier, i.e., "pc_2+pid_2", and, at the same time, the exception detecting module 315 could not detect occurrence of a faulting instruction. In that case, the CAM management module would only sets the flag field 332 of the data entry in which the second instruction identifier is located as invalid. The result is shown in FIG. 3F, wherein the instruction instr_2 is not outputted to the SPR 350, but the CAM management module sets the value of the flag field 332 of the entry entry_1 as 0, indicating that the storage space of the data entry is released.

Using the CAM 330, the instruction cached therein may be outputted to the SPR 350 in a single clock cycle. By configuring and using the flag bit 332 in the CAM data entry, a CAM data entry occupied by an instruction which is no longer in the instruction pipeline may be released; thereby the total amount of storage space needed for the CAM may decreased to the minimum possible.

Various embodiments of the apparatus for a hypervisor to obtain a faulting instruction of the present invention have been described above. According to the same inventive concept, the present invention also provides a control method and a corresponding control apparatus for a hypervisor to obtain a faulting instruction.

Referring now to FIG. 4A, there is shown a high-level flow chart of a control method in accordance with one embodiment of the invention. The control method 400 as shown in the figure is used for a hypervisor to obtain a faulting instruction, wherein the hypervisor 220 runs between a physical machine 210 including a central processing unit (CPU) 212 and a virtual machine 230. The control method comprises operations S410 and S420 of:

causing an instruction from the instruction fetching (IF) stage of the CPU instruction pipeline to be stored into a content addressable memory CAM (S410) and triggering the CAM to output a faulting instruction among instructions stored therein to a special-purpose register SPR which is accessible by the hypervisor according to the result generated in the write-back (WB) stage of the CPU instruction pipeline (S420).

Referring to FIG. 4B, according to an embodiment of the invention, the above operation S410 comprises operations S412-S414:

obtaining an instruction from the IF stage of the CPU instruction pipeline (S412);

obtaining a first instruction identifier from the IF stage of the CPU instruction pipeline (S414);

storing the obtained instruction in association with the first instruction identifier in the CAM (S416).

Referring to FIG. 4C, according to an embodiment of the invention, the above operation S420 comprises operations S422-S426:

obtaining a second instruction identifier from the WB stage of the instruction pipeline (S422);

detecting an exception interrupt signal from the WB stage of the instruction pipeline (S424); and causing the instruction associated with the second instruction identifier in the CAM to be outputted to the SPR in response to the exception interrupt signal indicating occurrence of a faulting instruction (S426). The instruction outputted to the SPR is actually the faulting instruction which has caused the exception.

According to an embodiment of the invention, the above operation S412 comprises obtaining the value of the program counter PC and the process identifier PID from the machine status register corresponding to the IF stage, and taking the combination of the PC and the PID obtained from the machine status register corresponding to the IF stage as the first instruction identifier.

According to one embodiment of the invention, the above operation S422 comprises obtaining the value of the program counter PC and the process identifier PID from the machine status register corresponding to the WB stage, and take the combination of the PC and the PID obtained from the machine status register corresponding to the WB stage as the second instruction identifier.

According to an embodiment of the invention, the control method 400 further comprises releasing the storage space of the CAM data entry where an instruction that is no longer in the instruction pipeline is located.

Figure 5A:
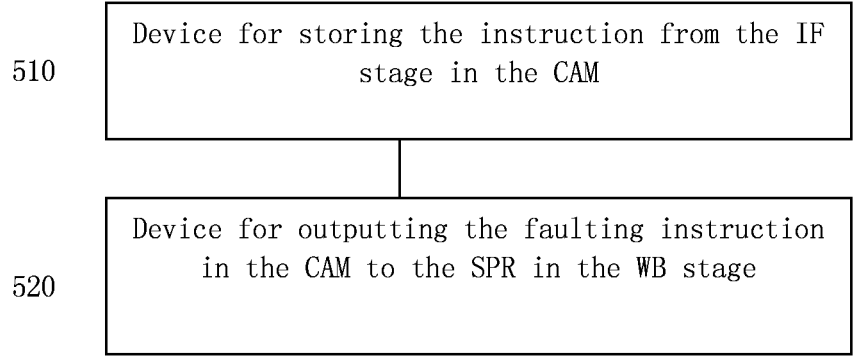
FIGS. 5A, 5B and 5C schematically show block diagrams of the control apparatus in accordance with embodiments of the present invention.

Referring to FIG. 5A, a block diagram in accordance with one embodiment of the invention is schematically shown. The control apparatus 500 as shown in the figure is used for a hypervisor to obtain a faulting instruction, wherein the hypervisor 220 runs between a physical machine 210 including a central processing unit (CPU) 212 and a virtual machine 230. The control apparatus includes a device 510 for causing the instruction from the instruction fetching stage of the CPU instruction pipeline to be stored into a content addressable memory CAM; a device 520 for triggering the CAM to output a faulting instruction among instructions stored therein to a special-purpose register SPR which is accessible by the hypervisor according to the result generated in the write-back (WB) stage of the CPU instruction pipeline.

Figure 5B:
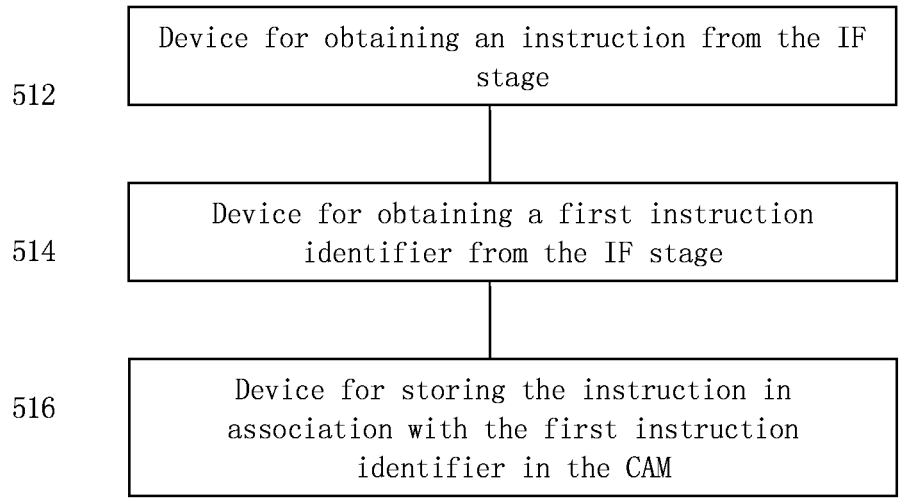

Referring to FIG. 5B, in accordance with one embodiment of the invention, the above device 510 includes a device 512 for obtaining an instruction from the IF stage of the CPU instruction pipeline, a device 514 for obtaining a first instruction identifier from the IF stage of the CPU instruction pipeline, and a device 516 for storing the obtained instruction in association with the first instruction identifier in the CAM.

Figure 5C:
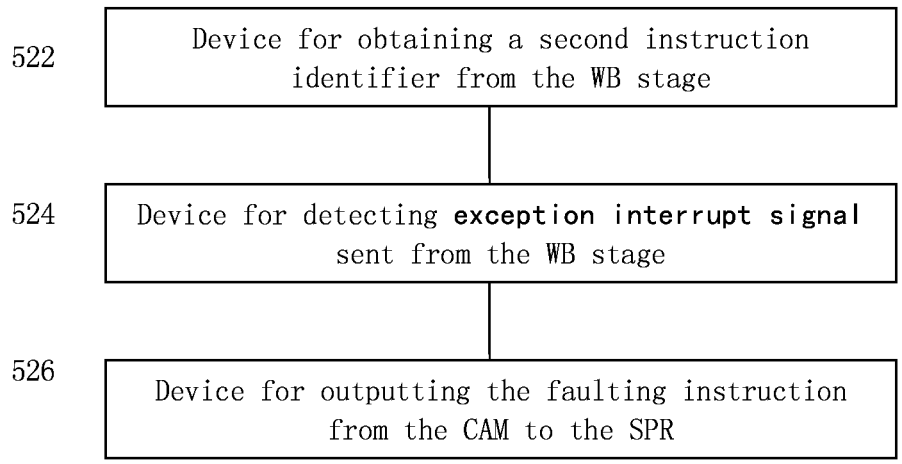

Referring to FIG. 5C, in accordance with one embodiment of the invention, the above device 520 includes a device 522 for obtaining a second instruction identifier from the WB stage of the instruction pipeline; a device 524 for detecting an exception interrupt signal sent from the WB stage of the instruction pipeline, and an device 526 for causing the instruction associated with the second instruction identifier in the CAM to be outputted to the SPR in response to the exception interrupt signal indicating occurrence of a faulting instruction.

In accordance with one embodiment of the invention, the above device 512 is further configured to obtain the value of the program counter PC and the process identifier PID from the machine status register corresponding to the IF stage, and take the combination of the PC and the PID obtained from the machine status register corresponding to the IF stage as the first instruction identifier.

In accordance with one embodiment of the invention, the above device 522 is further configured to obtain the value of the program counter PC and the process identifier PID from the machine status register corresponding to the WB stage, and take the combination of the PC and the PID obtained from the machine status register corresponding to the WB stage as the second instruction identifier.

In accordance with one embodiment of the invention, the above control apparatus 500 further comprises a device for releasing the storage space of the CAM data entry where an instruction that is no longer in the instruction pipeline is located.

Various embodiments of the control method and control apparatus for a hypervisor to obtain a faulting instruction of the present invention have been described above. Since various embodiments of the apparatus for a hypervisor to obtain a faulting instruction of the present invention have been described in detail above, in the description of the various embodiments of the control method and control apparatus for a hypervisor to obtain a faulting instruction, details that are repetitive or derivable from the description of the various embodiments of the apparatus for a hypervisor to obtain a faulting instruction are omitted here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for a hypervisor to obtain a faulting instruction, wherein the hypervisor runs between a physical machine including a central processing unit (CPU) and a virtual machine, the apparatus comprising:
    a content addressable memory (CAM);
    a special-purpose register (SPR) which is accessible by the hypervisor; and
    a control logic circuit with an input terminal connected to the CPU and an output terminal connected to the CAM, the input terminal receiving data from an instruction fetching (IF) stage and a write-back (WB) stage of a CPU instruction pipeline respectively, the output terminal causing instructions from the IF stage of the CPU instruction pipeline to be stored into the CAM and triggering the CAM to output a faulting instruction among the instructions stored therein to the SPR,
    wherein the control logic circuit further comprises a CAM management module, configured to release the storage space of the CAM data entry where an instruction that is no longer in the instruction pipeline is located.

2. The apparatus of claim 1, wherein the control logic circuit comprises:
    an instruction obtaining module, configured to obtain an instruction from the IF stage of the CPU instruction pipeline;
    a first instruction identifier obtaining module, configured to obtain a first instruction identifier from the IF stage of the CPU instruction pipeline; and
    an instruction caching module, configured to store the instruction of the instruction obtaining module in association with the first instruction identifier obtained by the first instruction identifier obtaining module into the CAM.

3. The apparatus of claim 1, wherein the control logic circuit further comprises:
    a second instruction identifier obtaining module, configured to obtain a second instruction identifier from the WB stage of the instruction pipeline;
    an exception detecting module, configured to detect an exception interrupt signal sent from the WB stage of the instruction pipeline; and
    an instruction outputting module, configured to cause the instruction associated with the second instruction identifier in the CAM to be outputted to the SPR in response to the exception interrupt signal indicating occurrence of a faulting instruction.

4. The apparatus of claim 2, wherein the control logic circuit further comprises:
    a second instruction identifier obtaining module, configured to obtain a second instruction identifier from the WB stage of the instruction pipeline;
    an exception detecting module, configured to detect an exception interrupt signal sent from the WB stage of the instruction pipeline; and
    an instruction outputting module, configured to cause the instruction associated with the second instruction identifier in the CAM to be outputted to the SPR in response to the exception interrupt signal indicating occurrence of a faulting instruction.

5. The apparatus of claim 2, wherein the first instruction identifier obtaining module is further configured to obtain the value of a program counter (PC) and a process identifier (PID) from the machine status register corresponding to the IF stage, and take the combination of the value of the PC and the PID obtained from the machine status register corresponding to the IF stage as the first instruction identifier.

6. The apparatus of claim 3, wherein the second instruction identifier obtaining module is further configured to obtain the PC and the PID from the machine status register corresponding to the WB stage, and take the combination of the PC and the PID obtained from the machine status register corresponding to the WB stage as the second instruction identifier.

7. A control method for a hypervisor to obtain a faulting instruction, wherein the hypervisor runs between a physical machine including a central processing unit (CPU) and a virtual machine, the control method comprising:
 causing instructions from an instruction fetching (IF) stage of a CPU instruction pipeline to be stored into a content addressable memory (CAM); and
 triggering the CAM to output a faulting instruction among instructions stored therein to a special-purpose register (SPR) which is accessible by the hypervisor according to the result generated in a write-back stage (WB) of the CPU instruction pipeline; and
 releasing a storage space of the CAM data entry where an instruction that is no longer in the instruction pipeline is located.

8. The control method of claim 7, wherein the causing instructions from the instruction fetching stage of the CPU instruction pipeline to be stored into a content addressable memory CAM comprises:
 obtaining an instruction from the IF stage of the CPU instruction pipeline;
 obtaining a first instruction identifier from the IF stage of the CPU instruction pipeline; and
 storing the obtained instruction in association with the first instruction identifier into the CAM.

9. The control method of claim 7, wherein the triggering the CAM to output an faulting instruction among the instructions stored therein to a special-purpose register SPR which is accessible by the hypervisor according to the result generated in the write-back stage of the CPU instruction pipeline comprises:
 obtaining a second instruction identifier from the WB stage of the instruction pipeline;
 detecting an exception interrupt signal sent from the WB stage of the instruction pipeline; and
 causing the instruction associated with the second instruction identifier in the CAM to be outputted to the SPR in response to the exception interrupt signal indicating occurrence of a faulting instruction.

10. The control method of claim 8, wherein the triggering the CAM to output an faulting instruction among the instructions stored therein to the special-purpose register SPR which is accessible by the hypervisor according to the result generated in the write-back stage of the CPU instruction pipeline comprises:
 obtaining a second instruction identifier from the WB stage of the instruction pipeline;
 detecting an exception interrupt signal sent from the WB stage of the instruction pipeline; and
 causing the instruction associated with the second instruction identifier in the CAM to be outputted to the SPR in response to the exception interrupt signal indicating occurrence of a faulting instruction.

11. The control method of claim 8, wherein the obtaining a first instruction identifier from the IF stage of the CPU instruction pipeline comprises:
 obtaining the value of a program counter (PC) and a process identifier (PID) from the machine status register corresponding to the IF stage, and taking the combination of the PC and the PID obtained from the machine status register corresponding to the IF stage as the first instruction identifier.

12. The control method of claim 9, wherein the obtaining a second instruction identifier from the WB stage of the instruction pipeline comprises:
 obtaining the value of the PC and the PID from the machine status register corresponding to the WB stage, and taking the combination of the PC and the PID obtained from the machine status register corresponding to the WB stage as the second instruction identifier.

13. A control apparatus for a hypervisor to obtain a faulting instruction, wherein the hypervisor runs between a physical machine including a central processing unit (CPU) and a virtual machine, the control apparatus comprising:
 a device configured to cause the instruction from an instruction fetching (IF) stage of a CPU instruction pipeline to be stored into a content addressable memory (CAM);
 a device configured to trigger the CAM to output a faulting instruction among the instructions stored therein to a special-purpose register (SPR) which is accessible by the hypervisor according to a result generated in a write-back stage of the CPU instruction pipeline; and
 a device configured to release the storage space of the CAM data entry where an instruction that is no longer in the instruction pipeline is located.

14. The control apparatus of claim 13, wherein the device configured to cause the instruction from the instruction fetching stage of the CPU instruction pipeline to be stored into a content addressable memory CAM comprises:
 a device configured to obtain in an instruction from the IF stage of the CPU instruction pipeline;
 a device configured to obtain a first instruction identifier from the IF stage of the CPU instruction pipeline; and
 a device configured to store the obtained instruction in association with the first instruction identifier into the CAM.

15. The control apparatus of claim 13, wherein the device configured to trigger the CAM to output a faulting instruction among the instructions stored therein to a special-purpose register SPR which is accessible by the hypervisor according to the result generated in the write-back stage of the CPU instruction pipeline comprises:
 a device configured to obtain a second instruction identifier from a WB stage of the instruction pipeline;
 a device configured to detect an exception interrupt signal sent from the WB stage of the instruction pipeline; and
 a device configured to cause the instruction associated with the second instruction identifier in the CAM to be outputted to the SPR in response to the exception interrupt signal indicating occurrence of a faulting instruction.

16. The control apparatus of claim 14, wherein the device configured to trigger the CAM to output a faulting instruction among instructions stored therein to the SPR which is accessible by the hypervisor according to the result generated in the write-back stage of the CPU instruction pipeline comprises:
 a device configured to obtain a second instruction identifier from the WB stage of the instruction pipeline;
 a device configured to detect an exception interrupt signal sent from the WB stage of the instruction pipeline; and a device configured to cause the instruction associated with the second instruction identifier in the CAM to be outputted to the SPR in response to the exception interrupt signal indicating occurrence of a faulting instruction.

17. The control apparatus of claim 14, wherein the device configured to obtain a first instruction identifier from the IF stage of the CPU instruction pipeline is configured to obtain the value of the program counter PC and the process identifier PID from the machine status register corresponding to the IF stage, and take the combination of the PC and the PID obtained from the machine status register corresponding to the IF stage as the first instruction identifier.

18. The control apparatus of claim 15, wherein the device configured to obtain a second instruction identifier from the WB stage of the instruction pipeline is configured to obtain the value of a program counter (PC) and a process identifier (PID) from the machine status register corresponding to the WB stage, and take the combination of the PC and the PID obtained from the machine status register corresponding to the WB stage as the second instruction identifier.

* * * * *